UNITED STATES PATENT OFFICE.

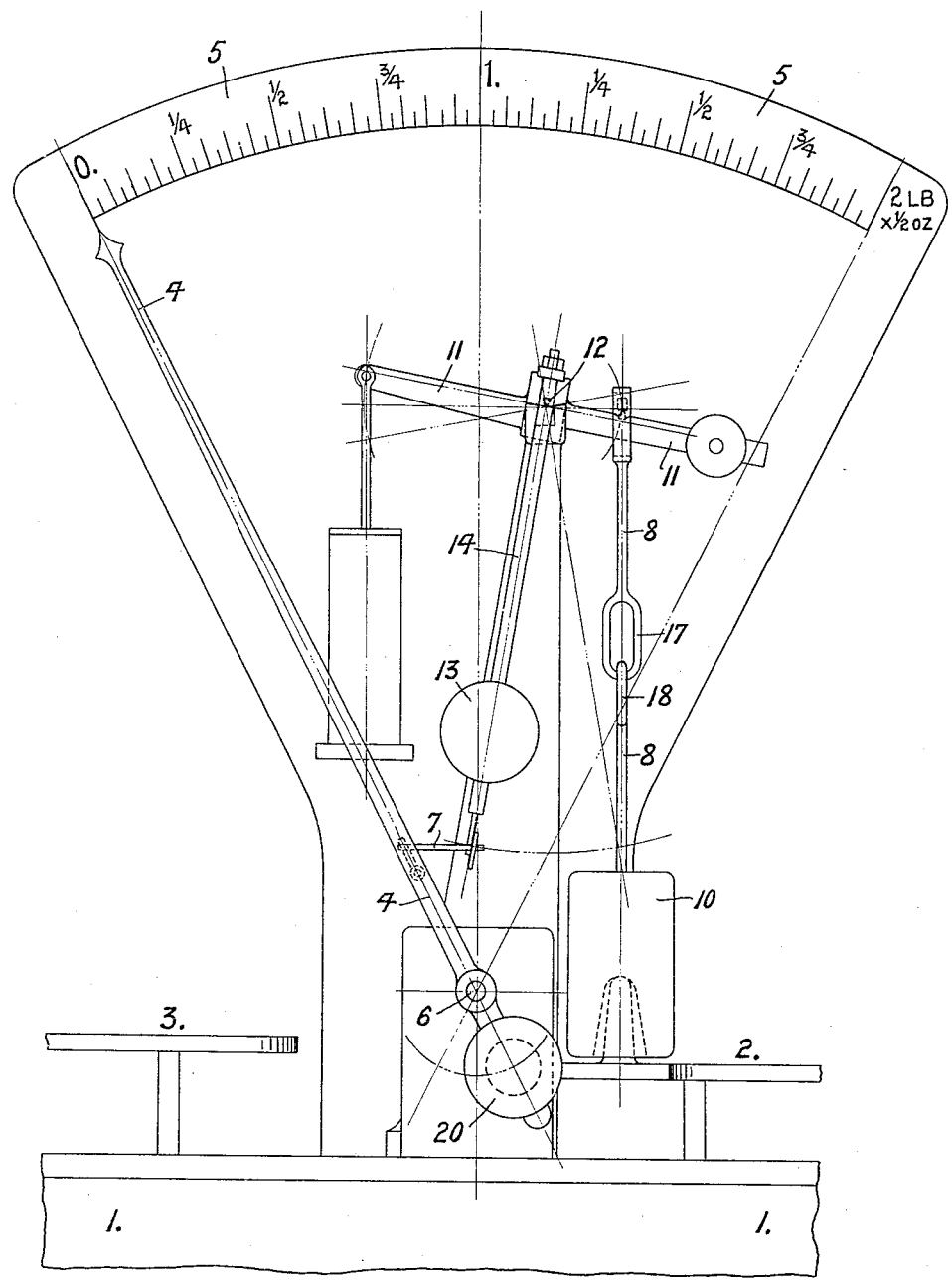

JAMES DOBSON, OF BIRMINGHAM, ENGLAND, ASSIGNOR TO HENRY POOLEY AND SON LIMITED (INCORPORATED 1914), OF BIRMINGHAM, ENGLAND.

WEIGHING-MACHINE.

1,130,154.   Specification of Letters Patent.   Patented Mar. 2, 1915.

Application filed February 25, 1914. Serial No. 820,937.

*To all whom it may concern:*

Be it known that I, JAMES DOBSON, a subject of the King of England, residing at Birmingham, in the county of Warwick, England, have invented new and useful Improvements in Weighing-Machines, of which the following is a specification.

This invention has reference to weighing machines, and more particularly those adapted for use on shop counters or under like conditions or for similar purposes, for weighing comparatively small quantities of goods; and it relates more particularly, furthermore, to a type of such machines wherein a part of the load is indicated on or by a scale, automatically, by the machine, and a movable pendulous resistance weight is used which varies in resistance according to its position, and which, plus another weight applied to the weight pan, will balance the load.

The chief object and effect of the present invention is to provide improvements in connection with machines of the kind referred to, by which it is rendered susceptible to alteration in the level of the counter on which it may be placed, or itself, without affecting the action of the indicator part or weighing action; and so by it—the invention—the inherent defect in all machines with pendulous weight resistances of insusceptibility to alterations of level of the counter or the surface on which they stand, is obviated.

The invention is illustrated in the accompanying drawing which shows a side elevation of weighing machine of the character herein above described, comprising the improvements hereunder; this species of weighing machine in general being one having a beam or lever having connected with it a pendulous resistance weight supported beneath its fulcrum, and a constant weight connected with and operating in connection with the weight pan scale, and the lever or beam, which when the weight pan rises will be acted upon or lifted by it, or pressed by it upward, and thereby when lifted, it permits movement of the indicator.

The improvement in weighing machines of the kind concerned, according to this invention, is set out in the claiming clauses concluding the specification.

In the drawing 1 is the base of the machine in which the pan supporting levers are placed; 2 is the scale weight pan; 3 is the goods pan; 4 is the indicating pointer, pivoted at 6; and 5 the weight scale over which it works.

10 is the constant weight which works in connection with the scale weight pan 2, and the indicating mechanism; 11 is the beam or lever pivoting on the knife edges at 12, which the weight 10 operates on, and works in connection with; and 13 are the pendulous resistance weights connected with and carried from the lever or beam 11. A free movement means is provided in the connecting part 8, connected with the weight 10 as in my former Patent No. 1,061,229, May 6, 1913, and this is provided by elongated links 17, 18, as in that case.

The indicator arm 4 is supported on a bearing, or pivoted at 6; and below this bearing or pivot, is a weight or mass 20; and this weight or mass 20, and the pendulous resistance weight or weights 13, as the case may be, are equal, or preferably nearly equal, the upper or pendulous resistance one, slightly preponderating; and the resistance weight supporting arm or arms 14, and the pointers 4 are coupled together by a connecting link 7 provided with knife edge connections, located between the weight 13 and the pivot 6.

In this machine, in action, the angular movement of the pendulous weight or weights 13, and the pointer weight 20 are in opposite directions. That is, if the pendulum weight or weights 13 move in a clockwise direction, the pointer 4 moves counter clockwise and thus under this invention, the effect of the weight 20 on the pointer is increased, and this weight consequently serves as a pendulous resistance weight, and has the effect of it; and if the pendulous weight or weights 13, and the pendulous resistance weight 20 have equal values, or nearly equal values, no alteration of the level of the machine will affect its balance.

In prior machines of the type of that concerned herein, the pendulous resistance weights are relatively very heavy, compared to those necessary to a machine constructed and adapted to operate according to the present invention; and they may be reduced as much as 75 per cent. The effect of this avoidance of the use of relatively heavy resistance weights, is that the life of the machine is rendered longer, and its accuracy greater.

As stated, by this invention, the machine is susceptible of being placed at different levels without affecting materially the correct weighing, and required action of the indicator; that is to say, the level of the machine may be changed, and yet the pointer will remain in its required position, and act in the required manner, and give, or indicate, the correct weight.

What is claimed is:—

1. In a weighing machine, the combination of a beam, a pendulous resistance weight on the beam, a pointer, a resistance weight of about equal the weight of the pendulous resistance weight thereon below the pivot thereof adapted to act as a resistance, the distance between these weights and their pivots unequal, and the said beam and its resistance weight, and the pointer being connected together, and the latter operated by the former, the said connection at a point to compensate for the difference in distance between the pivots of the weights, the parts arranged as and for the purpose described.

2. In a weighing machine, the combination of a graduated weight scale, a beam, a pendulous resistance weight thereon, a pivoted pointer operating over the scale, a resistance weight on and below the pivot of the pointer, the distance between the pivots of the weights unequal, a link connecting the beam and pointer at a point to compensate for the difference in distance between the said pivotal points, the parts arranged as and for the purpose described.

3. In a weighing machine, the combination of a graduated weight scale, a beam, a pendulous resistant weight thereon, a pivoted pointer operating on the scale, a resistance weight on and below the pivot of the pointer and of about equal weight to the aforesaid beam resistance weight, the distances between these weights and their pivots being unequal, a link connecting the beam and the pivoted pointer at a point to compensate for the difference in distance between the pivots of the weights.

In testimony whereof I have signed my name to this specification in the presence of two subscribing witnesses.

JAMES DOBSON.

Witnesses:
  SOMERVILLE GOODALL,
  MARGARET A. PLEWS.

Copies of this patent may be obtained for five cents each, by addressing the "Commissioner of Patents, Washington, D. C."